(12) United States Patent
Stillinger

(10) Patent No.: US 7,347,507 B1
(45) Date of Patent: Mar. 25, 2008

(54) BRAKE CONTROLLER

(76) Inventor: Ralph Stillinger, 2604 Kimberly La., Plano, TX (US) 75075

( * ) Notice: Subject to any disclaimer, the term of this patent is extended or adjusted under 35 U.S.C. 154(b) by 0 days.

(21) Appl. No.: 11/656,207

(22) Filed: Jan. 22, 2007

(51) Int. Cl.
G06F 7/70 (2006.01)
(52) U.S. Cl. .................. 303/7; 303/20; 701/70
(58) Field of Classification Search ........... 188/1.11 E, 188/1.11 L; 303/7, 20; 701/70
See application file for complete search history.

(56) References Cited

U.S. PATENT DOCUMENTS 5,615,930 A * 4/1997 McGrath et al. ............... 303/7
6,615,125 B2 * 9/2003 Eccleston et al. ............. 701/70
2001/0033106 A1 * 10/2001 Shirai et al. ................. 303/177
2005/0127747 A1 * 6/2005 Robertson .................... 303/20

* cited by examiner

Primary Examiner—Christopher P. Schwartz
(74) Attorney, Agent, or Firm—Young Basile

(57) ABSTRACT

Brake controller for controlling the brakes of a towed vehicle is provided. The controller includes microprocessor, an accelerometer, a storage array for storing a sequence of signals, and associated software for computing a moving average of accelerometer values thereby providing data on which the braking requirements of the towed vehicle can be determined. Feedback based on the power consumed during the braking event is likewise utilized to modify the power delivered to the braking system during subsequent braking events.

3 Claims, 13 Drawing Sheets

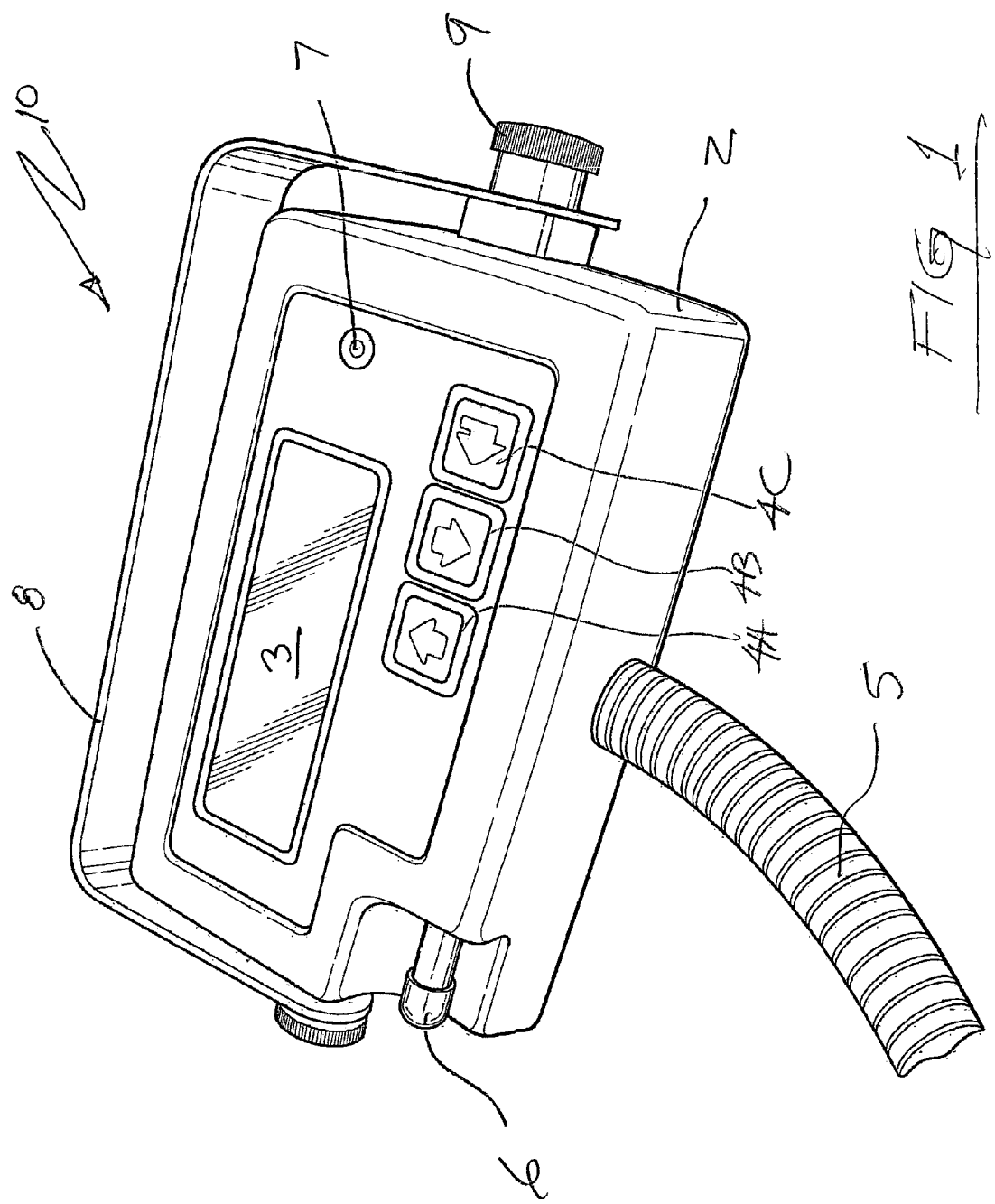

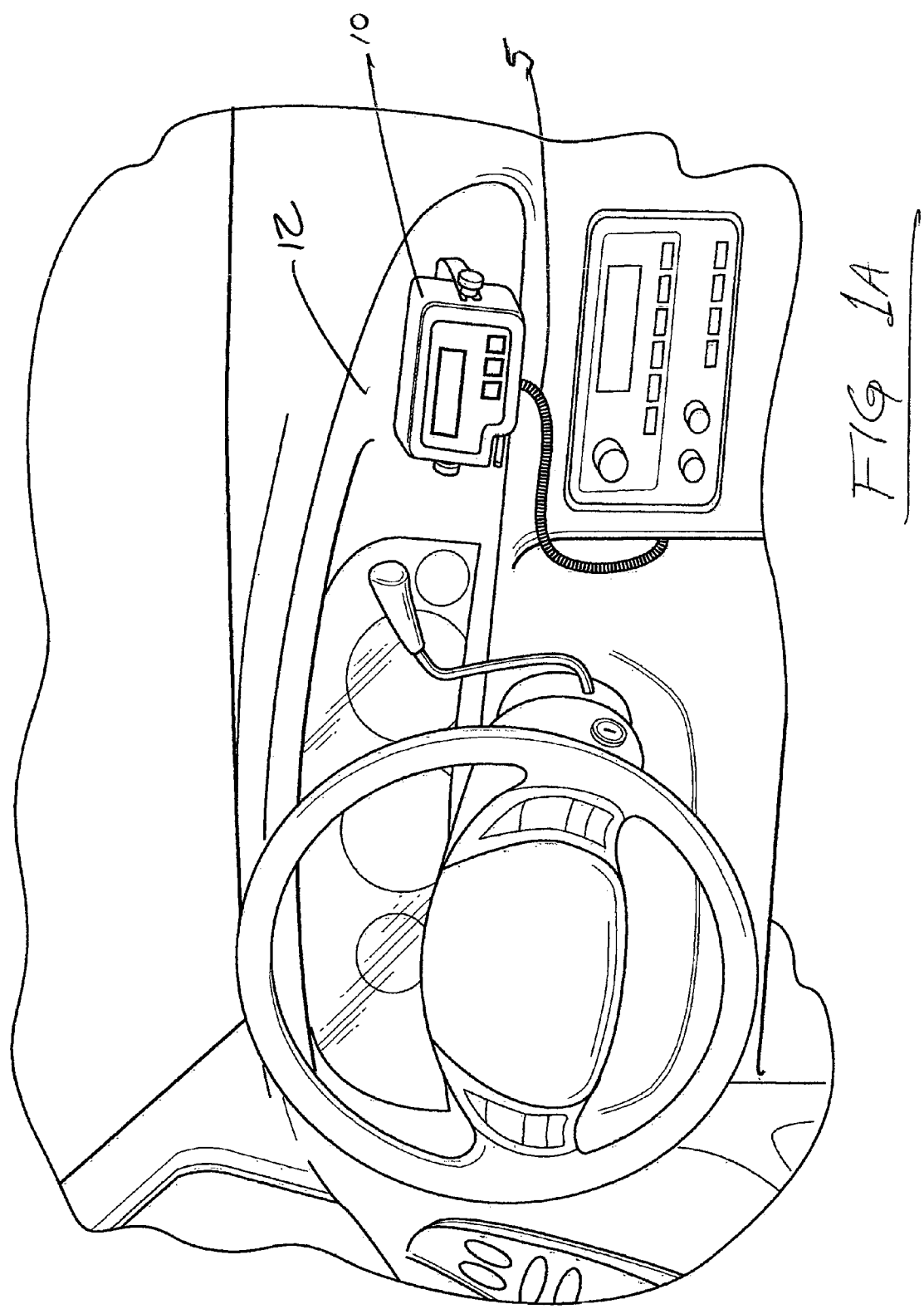

BRAKE CONTROLLER

FIELD OF THE INVENTION

The present invention pertains to brake controllers, and, more specifically, to controllers for applying selected amounts of power to the brakes of a vehicle.

BACKGROUND OF THE INVENTION

A wide variety of vehicles utilize electronic brakes. While these types of vehicle are typically of the class of towed vehicles such as trailers, in certain instances self-powered vehicles may also be provided with electronic brakes. Regardless, however, of whether or not the vehicle is independently operated, operating as a towing vehicle, or operating as a towed vehicle, the application of brakes to that vehicle dictates a consideration of a vehicle's speed, forward or rearward acceleration or deceleration, lateral acceleration or deceleration, as well as the angle, in relation to the horizontal, on which the vehicle may be operating, such as when climbing or descending a hill or other incline.

Brake controllers may be manufactured as a part of the vehicle, or may be independently manufactured and installed in the vehicle as an after-market item. In either event, the function of the brake controller is to apply a suitable amount of braking power to electronic brakes to insure a smooth, safe and controlled stop.

There are a number of problems with existing brake controllers. For example, after-market brake controllers are typically installed in cars, light trucks, or other towing vehicles to provide a braking signal to a trailer being towed by the towing vehicle and attached to the towing vehicle by a trailer hitch or similar mechanical attachment. For very light towed vehicles, it is possible and acceptable to dispense with a separate braking system for the towed vehicle, and, in fact, many lightweight trailers currently in use have no brakes of any kind. However, once the weight of the towed vehicle becomes more substantial, it is desirable to provide the towed vehicle with a separate braking system. While such systems may be hydraulic, pneumatic or electrical, it is generally accepted that electrical braking systems are the most desirable, inasmuch as they are simple to interface with the braking system of the towing vehicle.

In its simplest form, the brake controller used in this environment is a relay or switch which senses the operation of the brakes in the towing vehicle, and thereupon applies braking power to the towed vehicle. Often the controller senses a signal from the towing vehicle by virtue of the fact that the towing vehicle's brakes are operated simultaneously with the towing vehicle's brake lights. By connecting the towing vehicle's brake light circuit to the controller, the controller can be made to operate, and hence send a braking signal to the towed vehicle, whenever the brake lights of the towing vehicle are activated.

Unfortunately, such simple systems are entirely unsuitable for operation in a modern traffic system. It is undesirable that the towed vehicle's brakes be fully applied whenever the towing vehicle's brake light circuit is activated. Under these circumstances, the towed vehicle's fully applied brakes will essentially lock the towed vehicle's wheels, providing substantially more braking than is required and placing enormous stress on the mechanical connection between the towed and the towing vehicle.

It is essential, therefore, that the braking power being applied to the towed vehicle's brakes be proportional to the braking power applied to the towing vehicle's brakes and that the amount of braking power so provided be fully variable. Accordingly, just as an increase in pressure on the brake pedal of a motor vehicle having hydraulic brakes results in gradually increasing braking forces, so must a variable amount of braking power be applied to the electric brakes of the towed vehicle to insure a smooth and safe stop or deceleration.

Fortunately, electrical brakes installed on most towed vehicles are well suited to fully proportional operation. Since the electronic actuators in electronic brakes are capable of providing braking force proportional to the amount of electrical energy supplied, techniques and equipment have been developed to permit the gradual application and gradual release of braking forces to the electronic brakes of such vehicles.

One simple approach has been to provide a control device, such as a potentiometer, which applies a proportional amount of braking to a vehicle's electronic brakes depending on the position of the potentiometer over its range. For such a device to work effectively, however, it is essential that the potentiometer or other variable control be interconnected with the pneumatic or hydraulic brakes of a towing vehicle. Such interconnection requires substantial engineering and assembly effort, and is difficult to accomplish as a retrofit or after-market product. Further, while currently known brake controllers sometimes have such a variable control which can be manually operated, it is difficult to simultaneously apply braking to the towing vehicle (for example, with the foot of the operator), and to achieve comparable proportional braking to the towed vehicle (for example, with the hand of the operator), by operating a manual control on a separate controller device. Inevitably, in these circumstances, either too little or too much braking energy is applied to the brakes of the towed vehicle.

To overcome these problems, modern brake controllers often include a mechanical accelerometer which senses the amount of deceleration of the towing vehicle and applies electrical energy to the brakes of the towed vehicle in an amount proportional to the deceleration of the towing vehicle. In a non-abrupt, mild stop situation, where the towing vehicle may take a long distance to bring the combined towing/towed vehicle to a stop, the accelerometer would sense very little deceleration and apply little or no electrical energy to the brakes of the towed vehicle. By contrast, in an emergency stop situation, the accelerometer senses that the towing vehicle is making an abrupt stop, and accordingly the controller will apply a proportionally higher amount of electrical energy to the brakes of the towed vehicle. While this type of controller is a substantial improvement over the earlier and more primitive controllers, these controllers still tend to under-apply and over-apply forces during braking actions.

The inability of this type of controller to accurately measure acceleration and deceleration is a function of reliance on simple mechanical accelerometers. Presently, brake controllers do not compensate for resistive changes due to heat and the frequency of brake use. The amount of braking required by a vehicle in city driving, characterized by frequent starts and stops, is very different than that required by the same vehicle travel in a highway setting where there are fewer braking events. Further, these controllers are typically capable of measuring only straight line acceleration and/or deceleration, and do not sense or respond to lateral acceleration. Additionally, these controllers are not provided with the ability to sense the inclination of the towing vehicle, i.e., whether the towing vehicle is ascending or descending an incline. The amount of braking energy required to slow a vehicle moving up an incline is substantially less than that required of the same vehicle on level ground. Conversely, the amount of braking energy required for a vehicle descending an incline is substantially higher than that required for a vehicle decelerating on level ground. Finally, this type of controller operates in a temporally limited manner, i.e., it does not store and analyze data regarding vehicle movement and inclination.

Recently brake controllers have been developed which overcome some of these difficulties by using modern multi-axis solid state accelerometers. Robinson, et al., in U.S. Pat. No. 6,837,551, teaches the use of a multi-axis accelerometer in association with a microprocessor to supply braking to a towed vehicle in response to precisely measured acceleration forces in more than one axis. This device, however, uses polling techniques which do not provide enough acceleration data to assure smooth braking. Substantial improvements can be made to the existing art through improved algorithms for analysis of the accelerometer data, specifically by incorporating historical information regarding a towing vehicle's movement in advance of brake operation. By continuously monitoring the acceleration and orientation of the towing vehicle, more effective braking of the towed vehicle can be achieved.

Current controllers provide only limited feedback to the operator as to the condition of the brake controller itself, and the functionality of the brake controller both before and during the braking operation. The present invention provides an alphanumeric and graphical display for providing substantial feedback to the vehicle operator about the braking system.

It is an object of the present invention to provide a means to control the brakes of a vehicle by continuously compiling data regarding the movement and orientation of the vehicle in advance of a braking event.

It is another object of the present invention to provide a brake control device that accurately measures acceleration, deceleration and orientation of a vehicle without reliance on mechanical inputs.

It is further an object of the present invention to provide a controller which provides substantial information to the operator of a towing vehicle regarding the operation of the brake controller.

It is a further object of the present invention to provide a brake system controller which is easily operated by a person in a towing vehicle without the need for manipulation of mechanical controls.

It is a further object of the present invention to provide a brake controller for use in a towing vehicle that assures that the brakes of a towed vehicle are operated accurately and proportionally to the amount of braking energy required in view of the deceleration and/or orientation of the towing vehicle, both automatically, and through manual means.

It is a further object of the present invention to provide a brake controller which does not rely on mechanical inputs such as pneumatic and hydraulic sensors, but which provide superior braking through emulation of this type of mechanical input by simulating those inputs utilizing electronic hardware and software.

It is a further object of the present invention to provide a brake controller that automatically compensates for resistive changes in the braking environment, including heat or other resistive changes to the electrical braking system.

Other objects and advantages of the present invention will be apparent from the following description.

SUMMARY OF THE INVENTION

In accordance with the present invention, there is a brake controller which may be included as part of the original equipment in a towing vehicle, or provided as an after-market device. The controller is preferably provided with an enclosure, one or more mounting means, and one or more manually operable controls, as well as electrical connection means to permit the controller to be secured in a convenient location within the vehicle, and electrically connectable to the electrical circuits of the vehicle, and to any towed vehicle associated with the vehicle. The operational components of the controller are preferably contained on one or more printed circuit boards which carry a number of electrical components which will be explained in further detail herein.

In the preferred embodiment of the invention, the controller is mounted in such a location to insure that the controls are easily within reach of the vehicle operator, and so that the display provided on the controller is easily visible to the vehicle operator. The controller enclosure may be designed to be mounted to the dashboard, steering column, console, or other easily accessible element in the interior of the motor vehicle, including mounting in the instrument panel itself for both aesthetics and convenience of operation.

In the described embodiment, the controller is provided with a integral power supply which connects to the electrical power source of the vehicle in which the controller is mounted. The power supply serves to condition the electrical power from a vehicle in which the controller is mounted to insure a reliable source of electrical energy at the various voltages required by the electrical brake actuators, the brake lights, and the controller circuits themselves. In this fashion, reliable electrical voltage and electrical current parameters are maintained during operation of the controller.

The controller of the present invention utilizes a microcontroller which accepts inputs from an accelerometer, stores those inputs, and subsequently utilizes those inputs to provide a conditioned power output for operating the brakes of the towed vehicle. A customized algorithm provides electronic braking signals to the towed vehicle which emulate the braking power of a typical hydraulic brake, utilizing the accelerometer data. The controller also includes a full function display, which provides visual signals of the condition and operation of the controller.

Manual braking inputs are also available to the vehicle operator, and the controller provides to the operator substantial data regarding the braking event.

DESCRIPTION OF DRAWINGS

FIG. 1 is a perspective view of a controller according to an illustrated embodiment of the present invention.

FIG. 1A is a perspective view of a controller according to the present invention as installed in a motor vehicle.

DESCRIPTION OF PREFERRED EMBODIMENT

Figure 2:
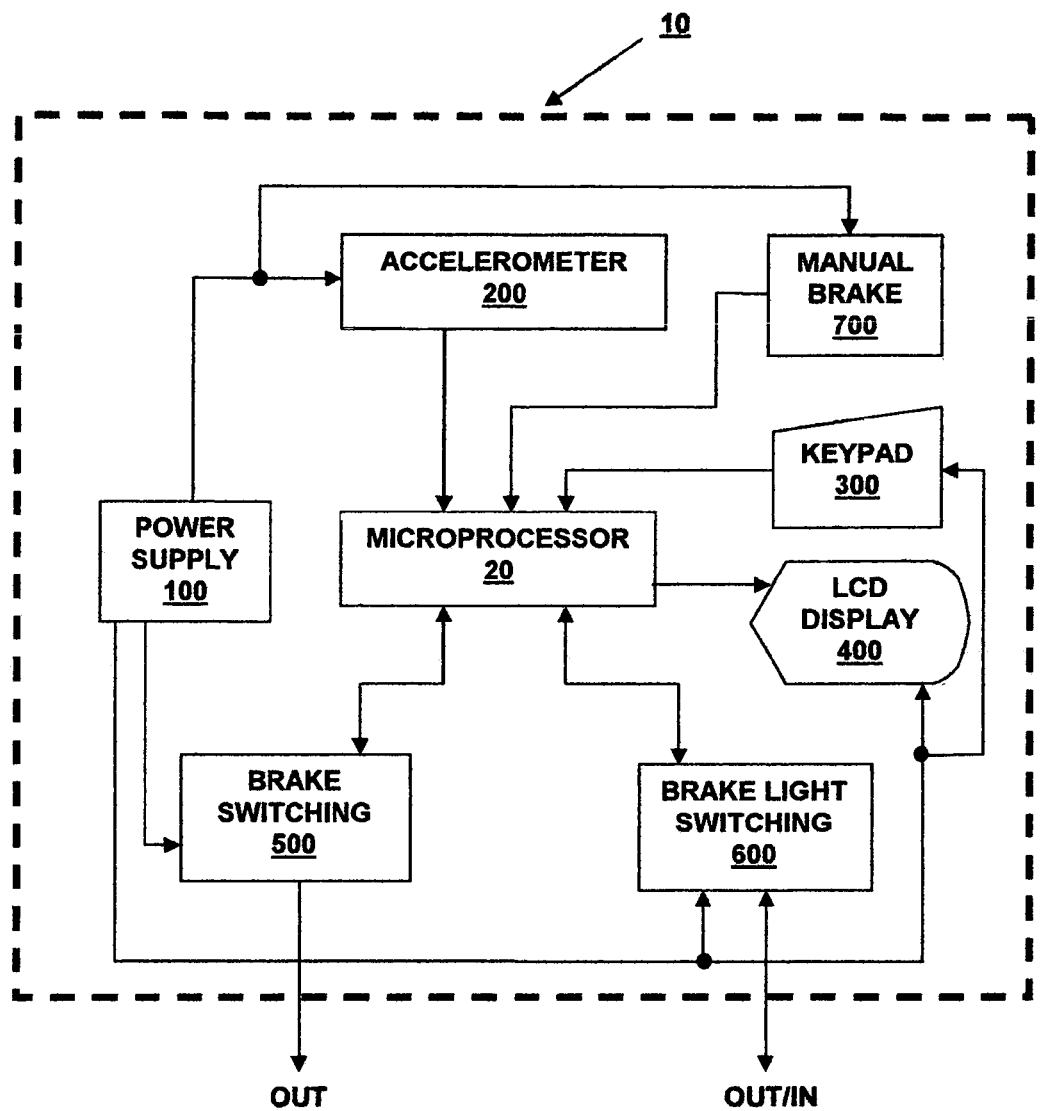
FIG. 2 is a block diagram of the various components of the controller showing interconnection between the controller and a towing and towed vehicle.

As depicted in FIG. 1 and FIG. 1A, the invention is a controller 10 which includes a case 2 which houses all of the electrical components, and features a lens 3 through which the display herein described may be visualized. The case 2 is further provided with a plurality of switches 4A, 4B and 4C which control the various functions of the invention as herein described. Electrical connections between the controller 10 and the vehicle in which it is mounted are made through a series of electrical conductors housed within an umbilical sheath 5 which provides protection for the electrical conductors and presents a neat, aesthetically pleasing configuration. The controller 10 also includes a manual switch 6, whereby a manual braking signal can be sent directly from the controller 10 to the vehicle braking system. Preferably, manual switch 6 is in the form of a spring-loaded, linear potentiometer which allows the switch to be easily operated over a range of motion by the hand of the vehicle operator. The controller 10 also features an enunciator window 7, typically housing a light emitting diode, which provides a power indication when the controller is generating a braking command.

To facilitate mounting of the controller 10 on a vehicle dashboard 12, the controller case 2 is provided with a bracket 8 and a pair of thumbscrews 9. This commonly used mounting arrangement provides substantial versatility for the controller 10 by simplifying the mounting of the controller 10 on the vehicle dashboard 12, and permitting the controller case 2 to be pivoted upward and downward so that the lens 3 of the case 2 is easily visible to the operator of the vehicle.

The invention and its operation will be further understood by referring to FIG. 2, a block diagram of the various components of the controller 10 showing interconnection between the controller 10 and a towing and a towed vehicle. The controller 10 comprises a microprocessor circuit 20, power supply circuit 100 and accelerometer circuit 200, a keypad circuit 300, a display circuit 400, a brake switching circuit 500, a brake light circuit 600 and a manual brake circuit 700. All of these components are interconnected by appropriate conductors, typically in the form of traces on a printed circuit board to which the various circuit groups are attached.

Central to the operation of the system is the microprocessor circuit 20 which receives information from the accelerometer circuits 200, the keypad circuits 300, the manual brake circuit 700, the brake switching circuit 500 and the stop light switching circuit 600. Likewise, the microprocessor circuit 20 provides signals which drive display circuits 400 and brake switching circuits 500 and stop light switching circuits 600.

Figure 6:
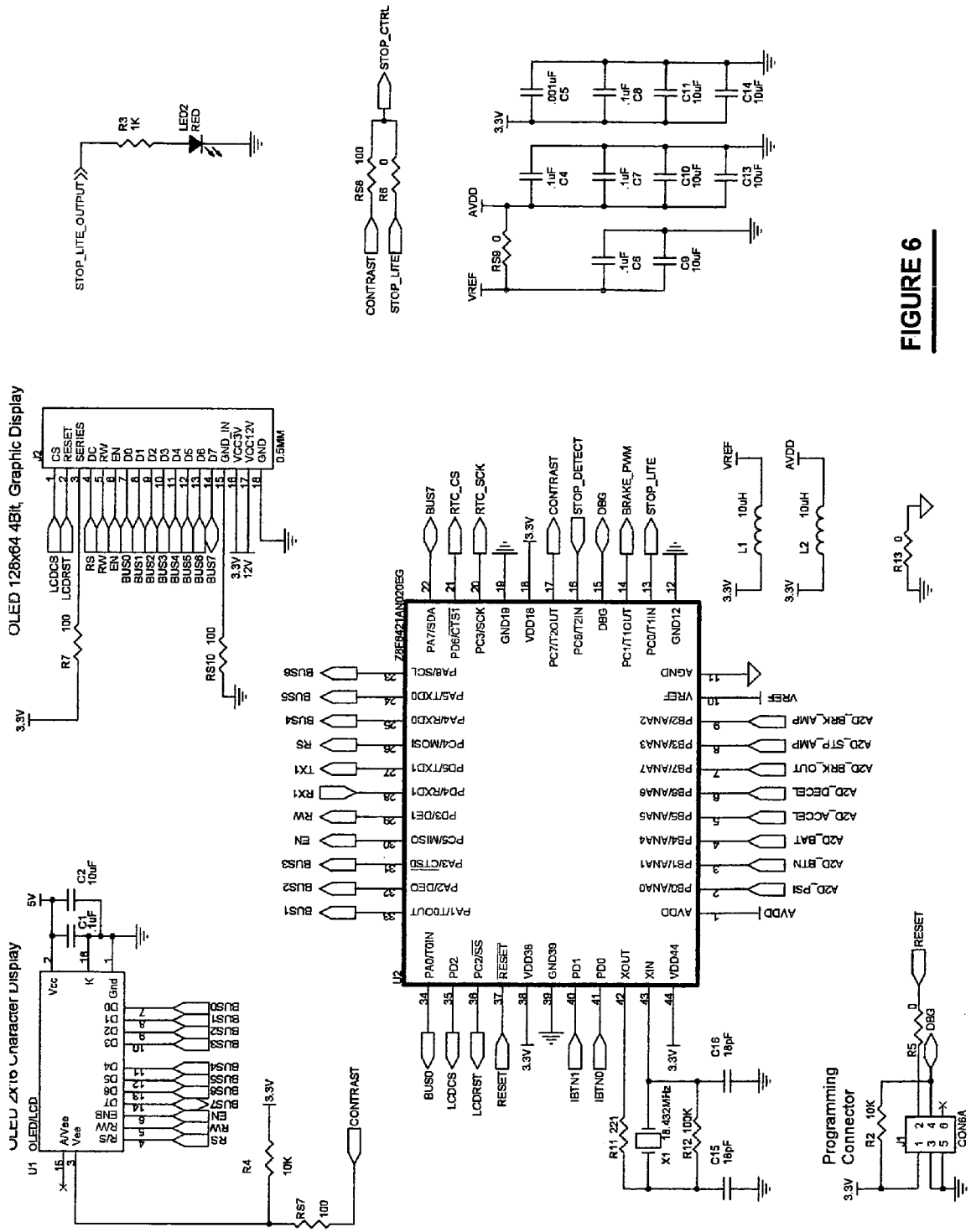
FIG. 6 is a schematic of the microprocessor and microprocessor interface to the components of the controller.

By way of overview, the power supply circuits 100 provide the necessary amounts of current at appropriate voltages, to all of the individual sub-circuits. The accelerometer circuits 200 sense acceleration, and present raw acceleration data to the microprocessor circuit 20. Manual brake circuit 700 accepts a manual braking signal from the vehicle operator, and present information regarding that braking signal to the microprocessor circuit 20. Keypad circuit 300 accepts inputs from the vehicle operator, and presents those inputs to the microprocessor 22 as shown in FIG. 6. Microprocessor circuit 20 processes signals from the microprocessor for human interface, and presents information regarding the operation of the controller 10 to display circuits 400. Stop light switching circuit 600 accepts information regarding a vehicle's stop lights and presents that information to microprocessor circuit 20. The same circuit accepts information from the microprocessor circuit 20 and conditions those signals for output to the vehicle's brake light circuit. Brake switching circuitry 500 accepts signals from the vehicle brake controls and presents that information to microprocessor circuitry 20. Likewise, microprocessor circuit 20 presents information regarding braking computations and commands for braking to brake switching circuitry 500, which in turn, provides braking power output to the vehicle's brakes.

Each of these sub-circuits will be discussed in detail in the following sections. Typically, all of the sub-circuits and their components are mounted to a single printed circuit board.

Power Supply

Figure 3:
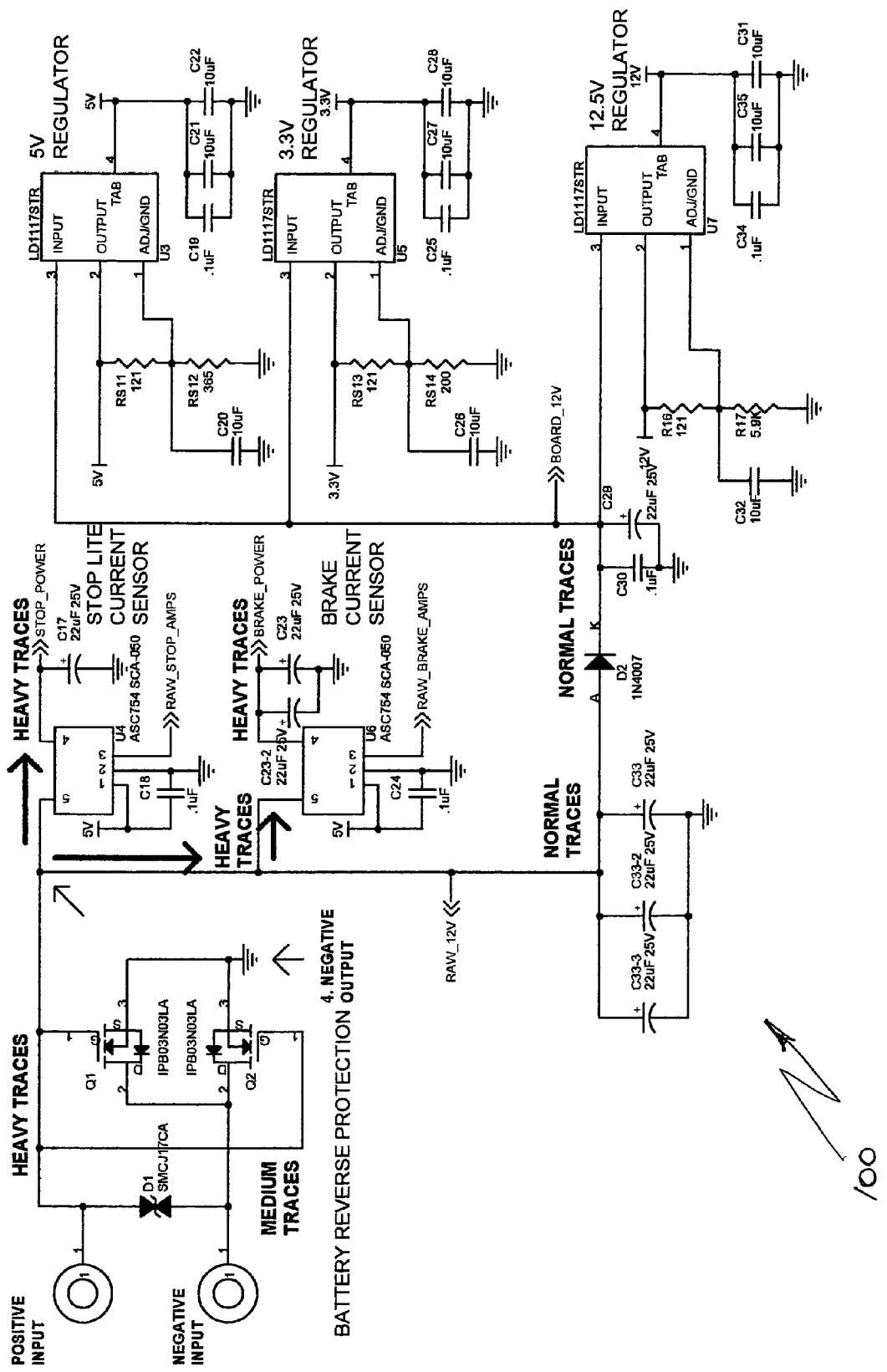
FIG. 3 is a schematic of the controller power supply.

As shown in FIG. 3, power to the controller 10 is derived from a power supply circuit 100 which employs reverse polarity protection without sacrificing power loss. Normally, reverse polarity protection schemes are accomplished utilizing diodes. However, even the best diodes have some voltage drop. These voltage drops generate heat in high current conditions. Therefore, many costly diodes are usually required to handle reverse polarity protection. In brake controllers of the type described herein, however, which generates high output current, the use of conventional diode reverse polarity protection is generally impractical. Instead, the present circuit utilizes field effect transistors which operate in parallel to protect the circuit without significant power loss.

As shown in FIG. 3, the vehicle in which the invention is used normally supplies 12 volts at 70 or more amperes through positive and negative inputs to the power supply. Typically, the source of this power is the vehicle battery/alternator combination. A transient voltage suppressor D1, such as a Fairchild SMCJ17CA is connected across the positive and negative input to filter transient voltages. This filtered input is then connected to FETs Q1 and Q2. Current will not flow in the circuit unless the negative input, i.e., the input connected to the drains of the FETs Q1 and Q2 has a lower potential than the positive input, i.e., the voltage provided to the gates. If the input power polarity is inadvertently reversed, the circuit is essentially disabled. The net result is fail-safe polarity protection without voltage drop or power loss.

Accordingly, 12 volt power is presented to the stop light current sensor U4 and brake current sensor U6. These are integrated circuit packages which are essentially amplifiers which provide the necessary high current required by the vehicle stop lights and the vehicle brakes. Heavy traces are utilized on the outputs of sensors U4 and U6 to carry the high currents generated thereby. The power supply also includes conventional integrated circuit voltage regulators U3 and U5 which provide carefully regulated output voltages to power the main components of the system. The resistor arrays RS11, RS12, and RS13, RS14 associated with each of the voltage regulators U3 and U5 are selected to provide the necessary resistances to the voltage regulators U3 and U5 to adjust the voltage to the desired level. A typical installation incorporates one or more filter capacitors arrays C19-C22 and C25-C28 associated with the voltage outputs. Additionally, one or more capacitors C33 (and optionally C33-2 and C33-3) are utilized to stabilize the raw positive input to the current sensors U4, U6 and voltage regulators U3 and U5.

Similarly, voltage regulator U7 and associated circuitry R16, R17 and C34, C35 and C31 provides well-regulated 12.5 volts DC for use by other elements of the controller circuit.

The power supply 100 thus generates well-regulated 5 VDC, 3.3 VDC and 12.5 VDC outputs, as well as a conditioned, high-current 12 volt output for supplying 12 VDC power to the electronic brake actuators and the vehicle stop light circuit.

Signals Interface Circuitry

Figure 5:
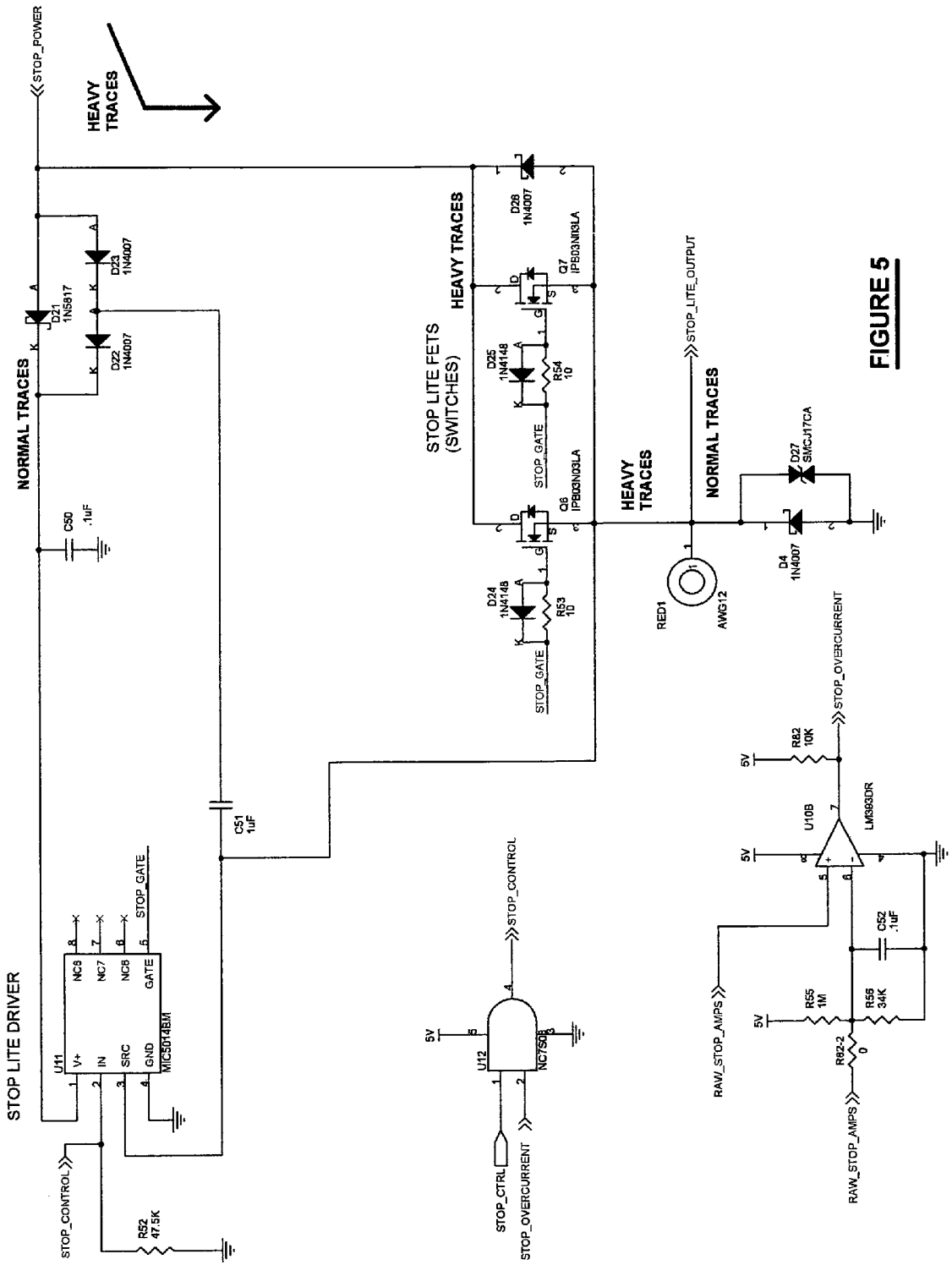
FIG. 5 is a schematic of the brake light circuitry.
Figure 5A:
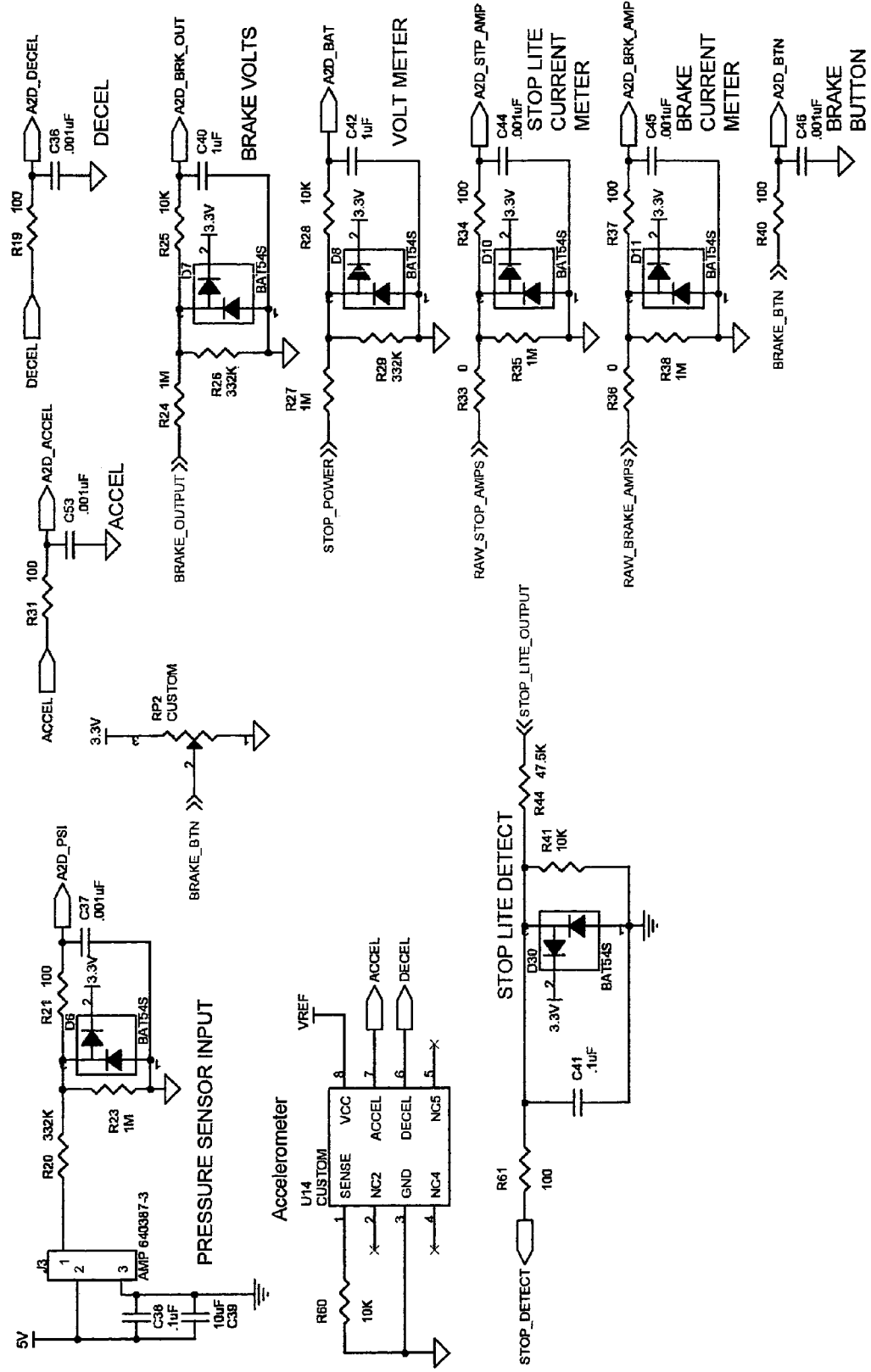
FIG. 5A is a schematic of the signals interface circuitry.

FIG. 5A collects on one sheet the various signals interface circuitry utilized by the invention. An accelerometer U14 is powered by the power supply circuit 100, and provides a variable DC voltage adjusted to 0-3.3v output. A graphical representation of the output of the raw accelerometer output is depicted on the upper graph trace A of FIG. 9. These acceleration/deceleration outputs are conditioned by R31, C53 and R19, C36 and presented to microcontroller U2. Hydraulic pressure sensing may be provided by an optional pressure sensor (not shown) which provides a variable output, which is conditioned by a circuit including one or more Schottky barrier diodes D6, associated capacitor C37, and resistors R20, R21 and R23. Typically, however, this sensing is used only for initial calibration of the circuit during manufacturing and for troubleshooting.

Similarly, the brake voltage output, voltmeter output, stop light current meter output, brake current meter output, manual brake button output, and stop light outputs are provided with comparable conditioning circuitry in the form of one or more Schottky barrier diode pairs D7, D8, D10, D11, and D30 and associated resistors and capacitors. These outputs are fed to the microprocessor U2 (shown in FIG. 6) and may be selectively displayed on display U1.

CPU Controller Circuitry

FIG. 6 represents the CPU controller circuitry, which is centered on a commercially available microcontroller U2 such as the Zilog Z8F series. The microcontroller U2 accepts inputs from the accelerometer circuits 200, and the towing vehicle's brake light circuitry, the manual brake operation circuits and a dedicated array of signal inputs as depicted in FIG. 5A. The controller 10 provides output to one or more status indicators, such as a multi-character alphanumeric display U1 or a graphic display U1A, and provides a pulse width modulated output signal which, when amplified, controls the braking function of the towed vehicle.

A typical microcontroller U2 adapted for this application is also provided with a crystal X1 controlled clock circuit including R12, C15 and C16 to provide the necessary timing signals. In one embodiment, the microcontroller U2 maintains its own internal read-only memory and random access memory, as well as analog-to-digital converters, on-board timers, multiple input/output ports and multiple universal asynchronous receiver transmitter (UART) circuits. Power is supplied to the multi-character display U1 and the microprocessor U2 by the system power supply circuit 100 depicted in FIG. 3.

The brakes of the towed vehicle are thus electrically operated by the controller 10. Operation of the towed vehicles brakes by the controller 10 of the present invention may occur in one of two ways: a) automatic brake operation responsive to vehicle speed, angle of ascent or descent, and acceleration or deceleration or b) "manual" brake operation, wherein the towed vehicle's brakes are directly operated responsive to a variable input from the vehicle operator independent of the operation of the towing vehicle's brakes.

Manual Brake Operation

An understanding of the manual operation of the brake system using hand switch 6 will best be understood with reference to FIG. 5, FIG. 5A and FIG. 6. In FIG. 5A, the signals' interface circuitry, the brake button potentiometer RP2 is depicted. RP2 is in the form of a conventional potentiometer, the adjustment of which is under manual control of the vehicle operator. The variable output of potentiometer RP2 feeds, through resistor R40, an input of the microcontroller U2. This input to the microcontroller U2 results in an output from the microcontroller of a variable voltage which is fed to the source of the stoplight driver U11 shown in FIG. 5. The stoplight driver U11 of FIG. 5 is in the form of a high-side MOSFET driver, the function of which is to provide the necessary voltages to the FETs Q6 and Q7, which require higher voltages for operation than other similar semiconductors. The input to the stoplight driver U11 also is connected to an LED 2 which illuminates to provide a visual indication that manual braking power is being applied to the towed vehicle. The output of a driver U11 activates FETs Q6 and Q7 which, together with their associated circuitry, provide output to actuate the vehicle brake lights. Heavy traces are used as depicted in this schematic to ensure that the controller 10 has sufficient current carrying capability to supply current to a large array of brake lights.

Figure 4:
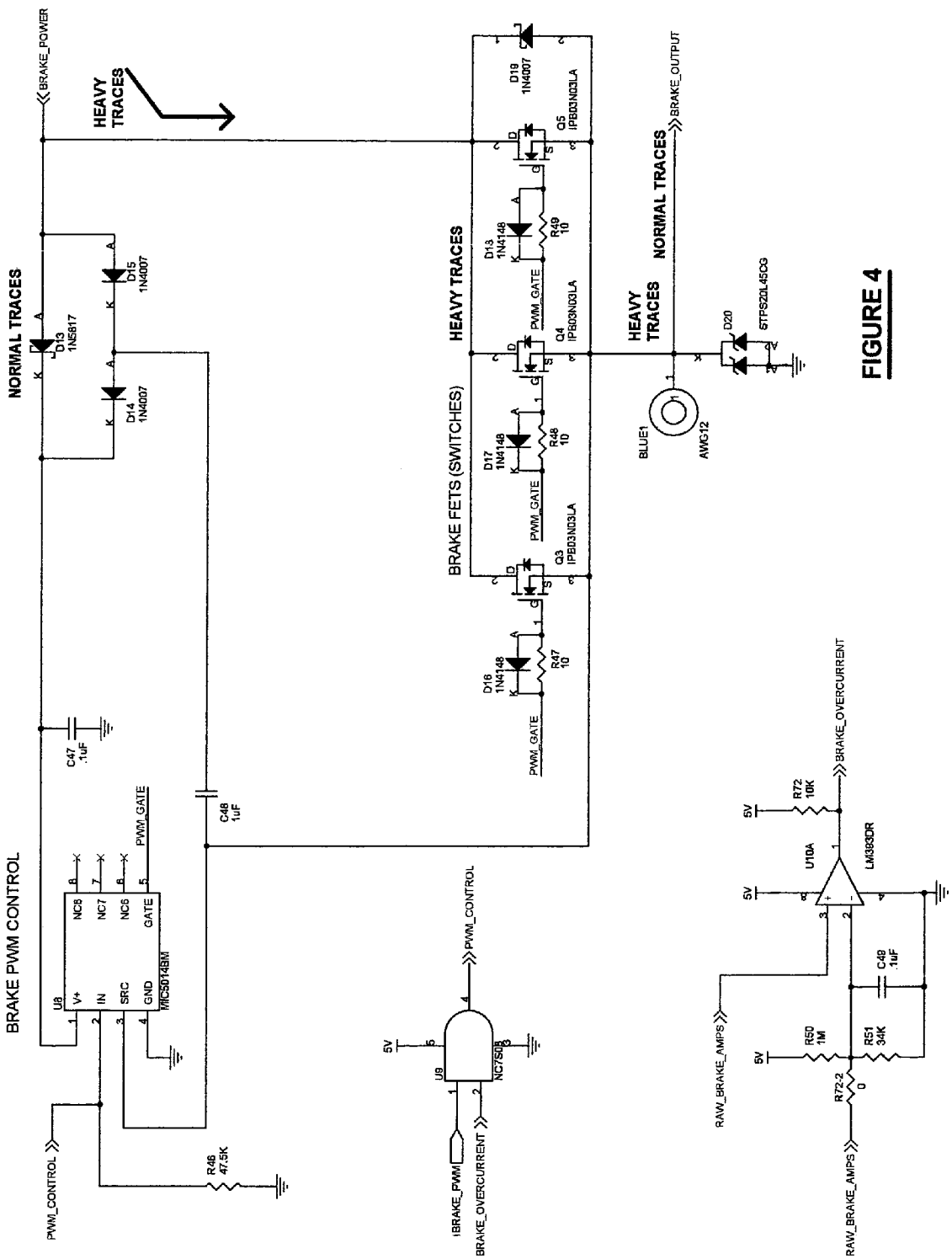
FIG. 4 is a schematic of the brake switching circuitry of the controller.

In a similar fashion, manual operation of the brakes produces a brake output which is presented to the circuitry of FIG. 4. Brake power for power supply circuit 100 is controlled by driver U8 and switched by brake FETs Q3, Q4 and Q5, which collectively route sufficient power to the electrical braking components of the towed vehicle.

In the automatic braking mode, the occurrence of a braking event is sensed as the brake pedal of the towing vehicle is depressed and the brake light circuit in the towing vehicle is activated. As depicted in FIG. 5, the towing vehicle's stop light power bus is activated when the brake pedal is depressed. The presence of 12 volts on the towing vehicle's stop light bus is sensed by the microcontroller U2, which initiates the braking action in the towed vehicle according to a number of other input parameters.

The microcontroller U2 functions to sense the occurrence of a braking event when the stop light output of FIG. 5A is energized to 12 volts. This output is conditioned by the stop light detect barrier diodes D30 to generate an appropriate 3.3 volt output to be sensed by the microcontroller U2.

Prior to and during the braking operation, the microcontroller U2 receives continuous input from the accelerometer U14 depicted in FIG. 3. Accelerometer U14 is continuously providing data regarding the x and y angle, acceleration and/or deceleration of the towing vehicle in which the controller 10 of the present invention is installed.

In the present invention, a principal feature is to provide electronic brake output signals which correspond to the brake signals being provided by the towing vehicle's hydraulic braking system. In other words, it is desired that the force supplied to the electronic brakes of the towed vehicle should correspond to the force applied to the hydraulic brakes of the towing vehicle.

Figure 9:
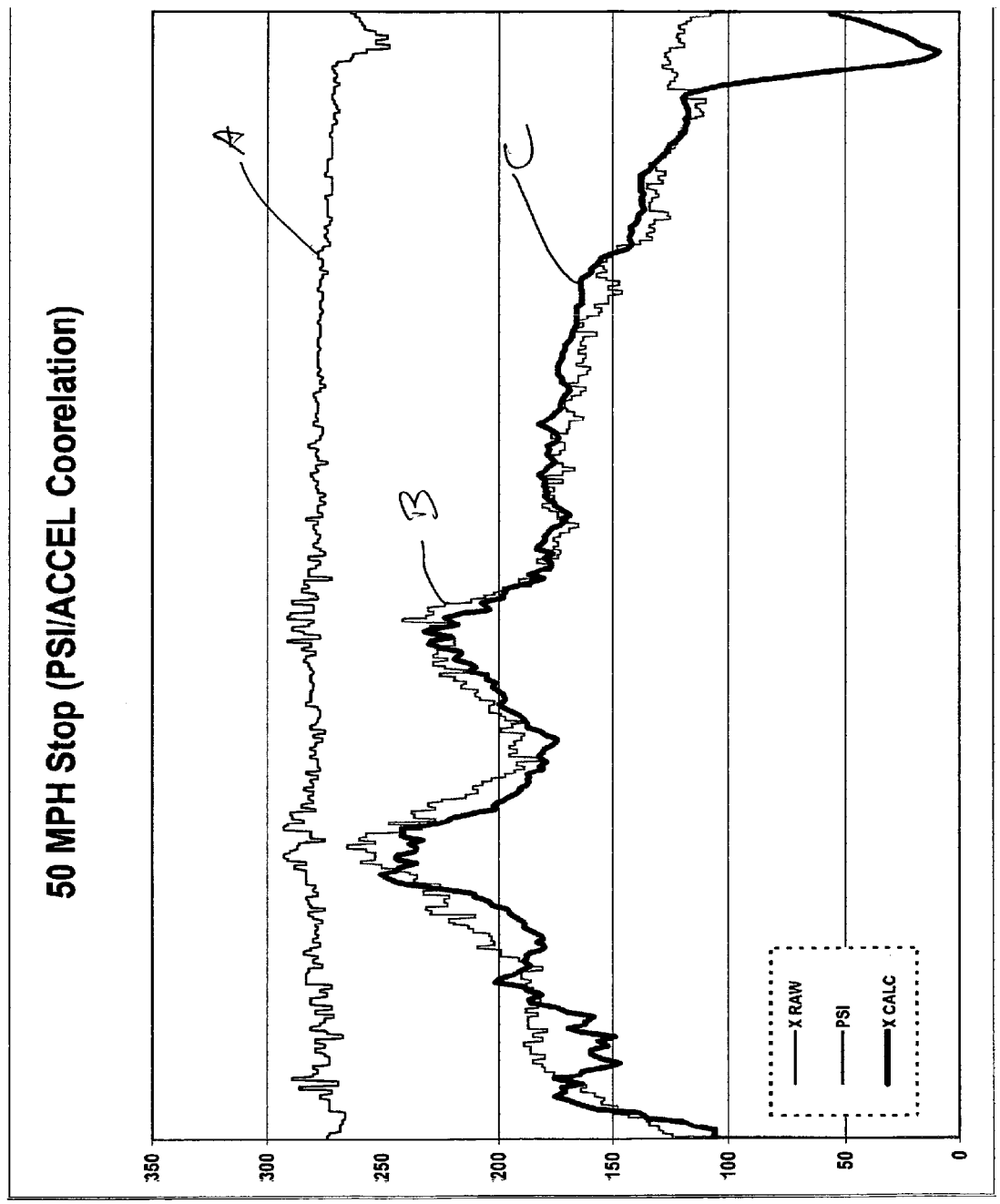
FIG. 9 is a chart depicting the raw and extrapolated accelerometer readings compared to the hydraulic pressure per square inch being produced by the hydraulic braking system of the towing vehicle.

By creating a mathematical model of the desired braking action, it is possible to precisely control the towed vehicle brakes. An example of this methodology is depicted in FIG. 9, which is a graph representing typical hydraulic brake force applications B, raw accelerometer readings A and the resultant computed current output C from the present invention to the magnetic brakes on the towed vehicle.

The upper array of points on the graph reflects the raw inertial values (from 0-3.3 UDC) produced by the accelerometer U14 in the x axis during a straight-ahead stop.

The array of graph points B represents the pounds per square inch of braking pressure being applied to the towing vehicle's brakes by the operator of the towing vehicle.

An array of points designated C represents the actual electrical braking power output produced by the present invention in response to the braking event.

On the graphical representation of FIG. 9, the range of pressure represented by the line B on the graph represents a typical fifty (50) mile per hour stop and reflects hydraulic pressure per square inch of between 0 and 2000 PSI. Corresponding to line C is the calculated and corresponding electrical output from the controller 10, showing an amplified signal output between 0 and 4.5 volts. The raw output of the accelerometer varies between 0 and 3.3 volts.

The present invention uses a well-defined algorithm to calculate effective braking. During a non-braking condition, the algorithm causes the microcontroller U2 to take readings from the accelerometer U14 every ten milliseconds. These readings are stored in an array in memory in the microcontroller. During a braking event, accelerometer output readings are likewise taken every 1 millisecond and subsequently averaged every millisecond, and stored in an array in memory in the microprocessor as depicted below:

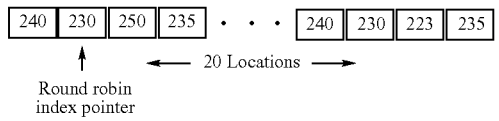

These stored values are utilized for calculating a trend line of motion acceleration and deceleration of the vehicle. The array is continuously updated with every reading, rotating the older readings out of the array at the same time that newer readings are stored. The values in the array are utilized as a basis for computing the amount of electrical energy which must be imparted to the brakes during the braking operation. By thus computing a moving average acceleration value in advance of the braking event, a more precise determination of actual braking requirements can be determined during the deceleration process. For example, slower average speeds during non-braking activity yields smaller braking requirements during a braking event.

Pulse Width Modulated Braking

Figure 10:
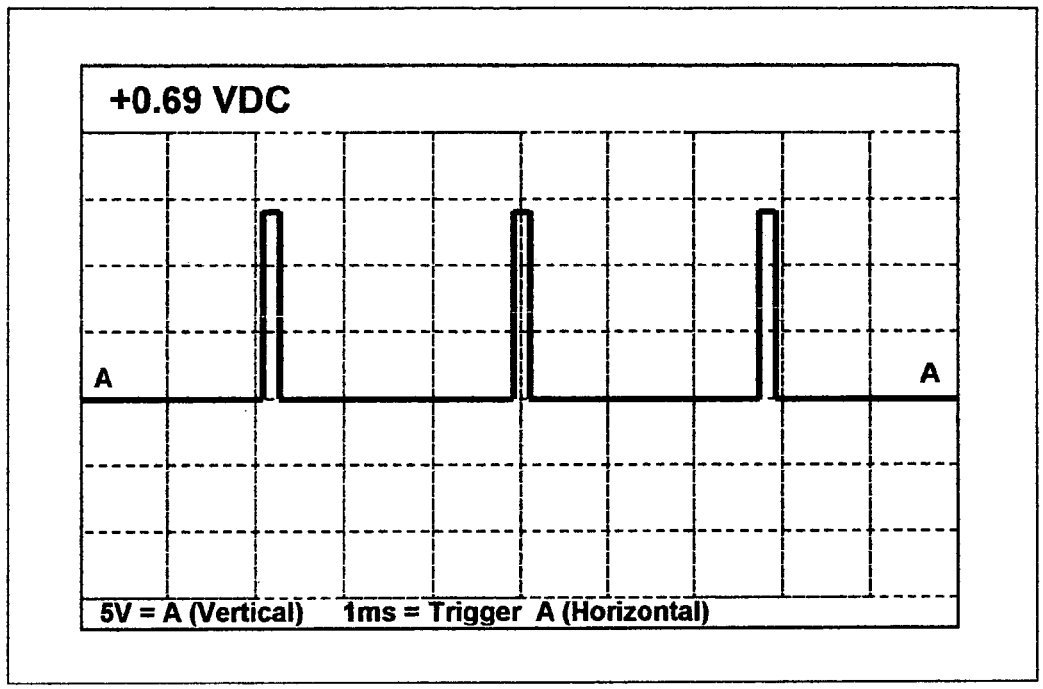
FIGS. 10-12 are depictions of various pulse width modulated braking signals.
Figure 11:
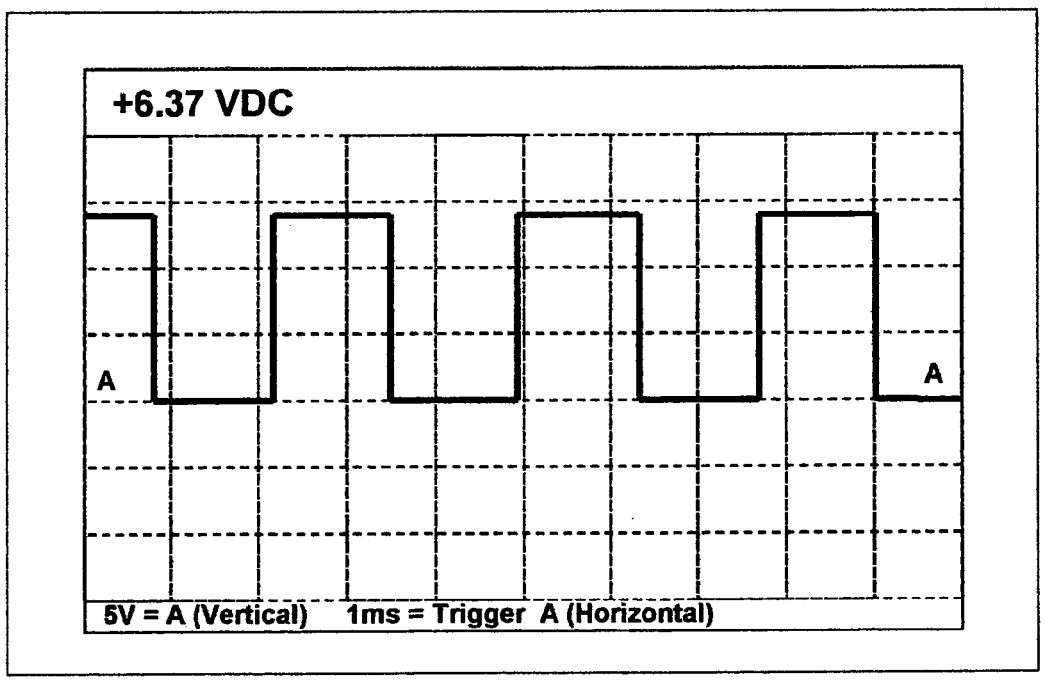
Figure 12:
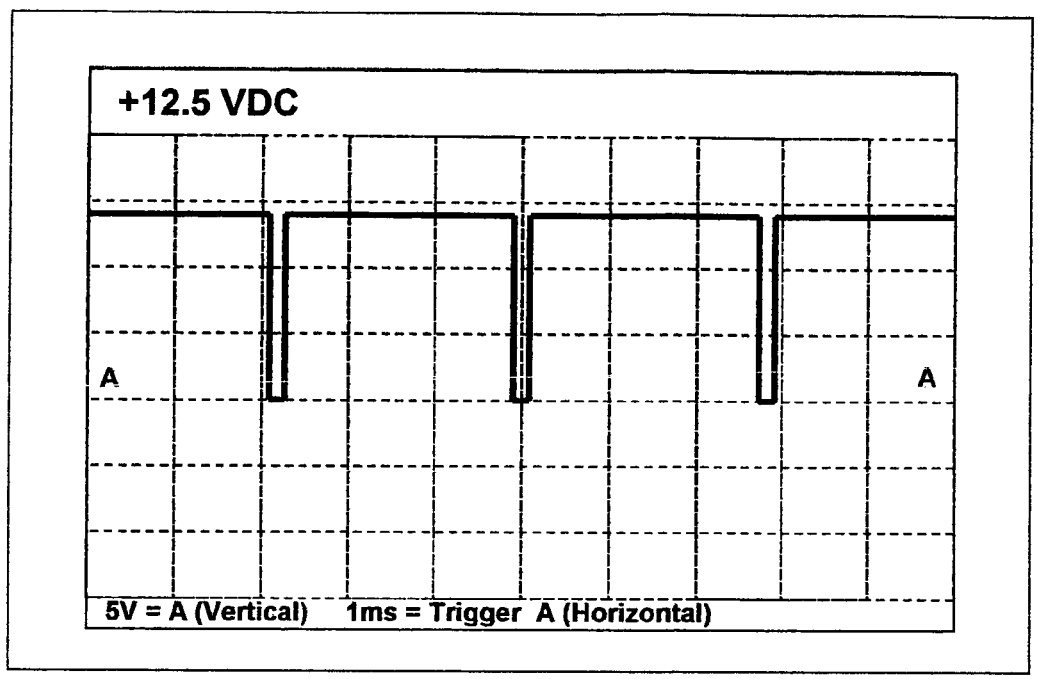

The present invention utilizes a pulse width modulated signal to control trailer braking. It has been determined that a square wave pulse width modulated signal generates an improved braking signal as opposed to sinusoidal waves or flat voltages. It is desirable that braking energy be applied to electric brakes in short bursts. By regulating the width of the pulse of electrical energy supplied to the magnetic brake actuator within the conventional electronic brake, a smoother and better controlled braking operation is insured. FIGS. 10-12 depict three typical braking signals which may be applied utilizing pulse with modulation circuits. In FIG. 10, a typical 13.7 volt automotive source voltage is applied to the magnetic brake utilizing 1 millisecond duration per pulse. The net effective voltage applied to the magnetic brakes is 0.69 volts DC.

In FIG. 11, a longer duration signal is supplied, providing effective voltage of 6.37 volts DC. In FIG. 12, the pulse width duration is substantially longer, producing an effective voltage of approximately 12.5 volts DC.

The amount of braking power generated by the controller is also adjusted in relation to the measured performance of the electronic brakes to compensate for brake overheating and fade as a result of a higher frequency of brake application. It is well known that the amount of current drawn by electronic braking systems varies with the temperature of the electronic brake actuators. Accordingly, by evaluating changes in current required by the braking actuators under similar pulse width modulation duty cycles, the present invention recognizes and adjusts subsequent brake output by varying the pulse width modulated signal in response to the changing power requirements of the brake electronic actuators. To further improve the response of the controller to these varying power requirements, software within the microcontroller periodically reevaluates changes and duty cycle required by trends in braking power utilized.

Main Process Flow

Figure 7:
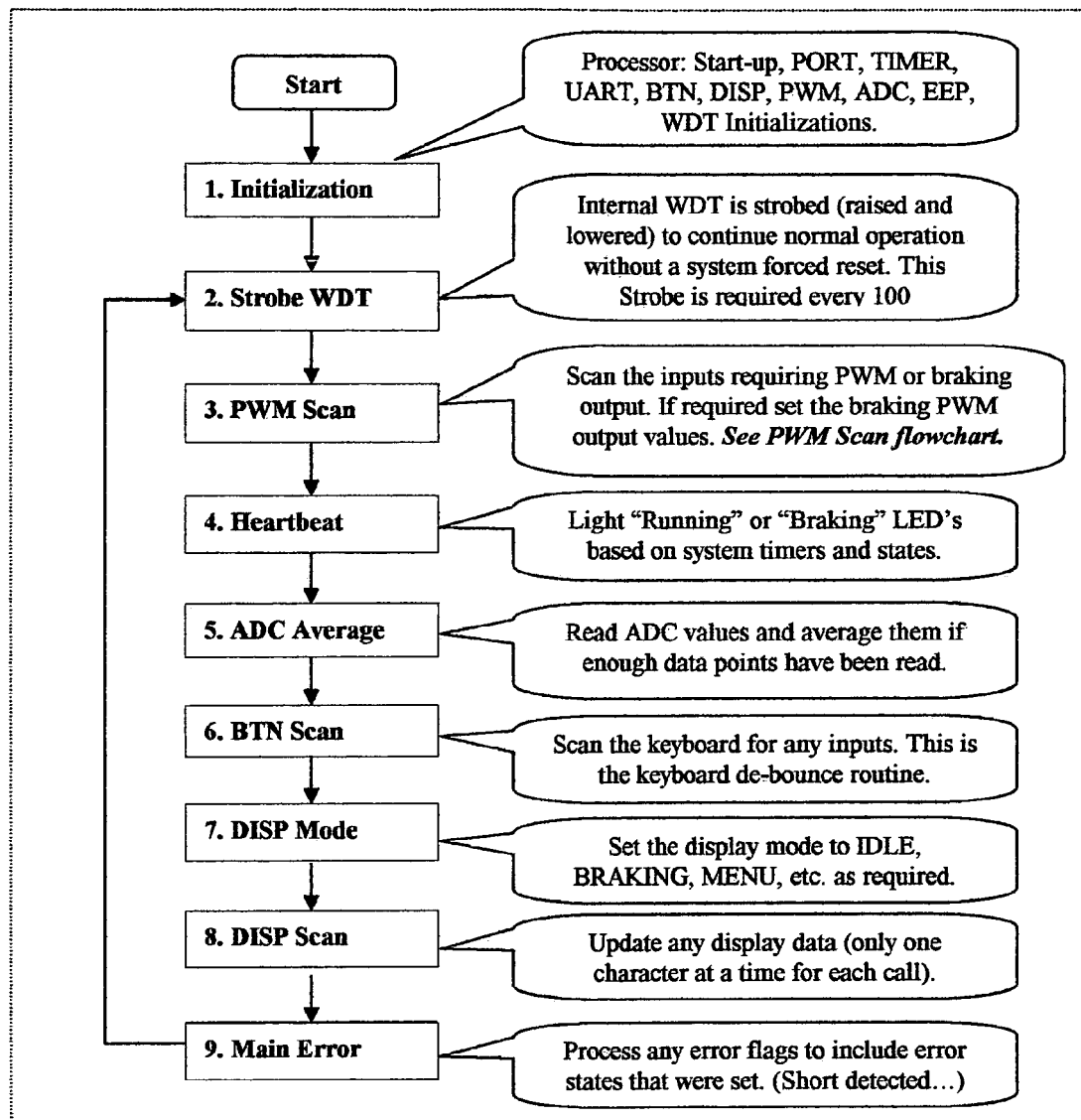
FIG. 7 is a flow chart of the main process loop software for operation of the controller.

A better understanding of the functioning of the system will be obtained by reference to FIG. 7, which is a flow chart outlining the main process and control of the invention.

In the initialization step, which occurs automatically upon power-up of the controller, the microprocessor initiates a start-up routine which initializes the various timers, UARTs, display, pulse width modulation and analog to digital controls circuits and internal software.

The first operative step in the main loop process is the strobing of the internal watchdog timer. Periodic strobing of the internal watchdog timer is necessary to continue normal operation of the microcontroller and associated circuitry without a system reset. The watchdog timer is set to require a strobe signal every 100 milliseconds. If the watchdog timer determines that more than 100 milliseconds have passed without a strobe signal, the system resets. In the event of a system reset, an error flag is set and an appropriate message is reported by the controller 10, which is both stored and presented to the controller display U1.

Figure 8:
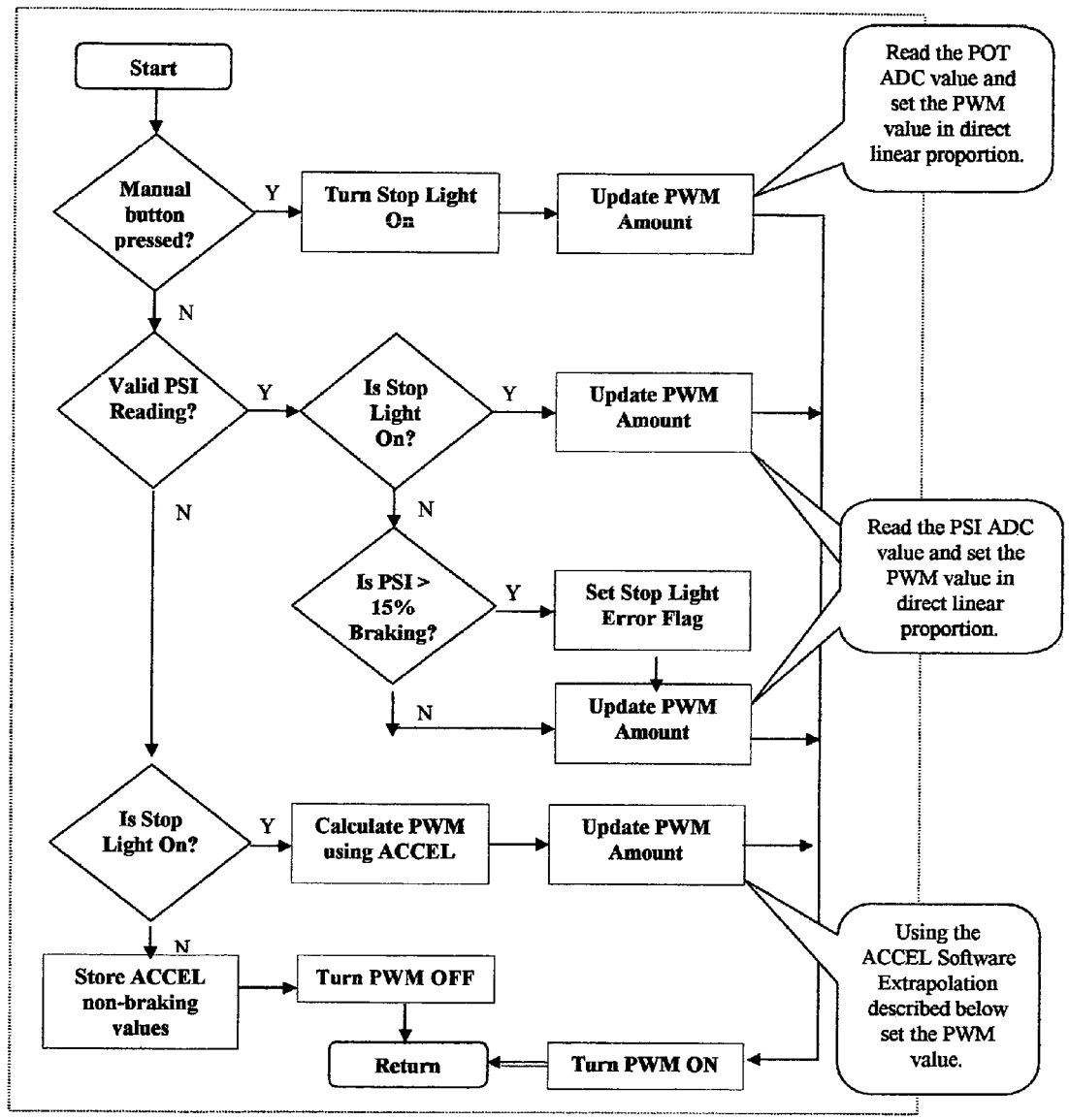
FIG. 8 is a flow chart of the brake action software utilized by the controller.

Assuming that the watchdog timer conditions have been met, the main process continues to the pulse width modulation scan process, wherein the microcontroller scans the inputs which determine requirements for pulse width modulation output or steady state braking output. If pulse width modulation braking is called for, the pulse width modulation circuitry and software functions as described herein in the pulse width modulation scan flow of FIG. 8 is implemented.

The next step in the main loop flow chart is illumination of the "braking" light-emitting diode on the controller. Brake controller 10 is designed to be operative regardless of whether the vehicle in which the controller 10 is located is operating with the engine-driven electrical system generating power, and will operate from the battery power of the vehicle in which they are installed, to insure that the controllers will continue to operate the brakes, regardless of whether the vehicle's engine is in operation, for safety purposes. Because the brake controller of the present invention utilizes a display utilizing a measurable, albeit small, amount of electrical current, the circuits are designed to extinguish the display after approximately 150 minutes of inactivity. Even though the display is extinguished, however, the controller continues to function.

The next step in the main loop process involves reading and averaging values from the analog to digital converter hardware and software within the microprocessor. The accelerometer provides a continuous signal in the form of a varying voltage proportional to the amount of acceleration or deceleration in a predetermined axis. This information is fed to the analog to digital conversion circuitry of the microprocessor, and software routines utilized by the microprocessor convert the accelerometer signal to a digital value which is then transferred to the accelerometer value array. The utilization of the data from the accelerometer value array is discussed in further detail, infra.

The next step in the main process is scan of the keypad inputs. The controller is provided with one or more switches as part of a user keypad which allows the user to select options for the operation of the controller and the operation of the display. During each cycle through the main process loop, the microprocessor scans to determine whether or not any such user input has been received, and if so, generates the necessary action responsive to the keypad input.

The next steps in the main process flow are the initiation and/or refresh of information to be displayed on the display provided on the controller. The display is appropriately updated with data or messages presented to the display by the microprocessor.

The final step in the main loop process is the error flag detect and process step. Should any input to the microprocessor fall outside predetermined specifications, an error flag will be set, and an appropriate indication will be returned to the display.

The above-described main process loop continues for as long as power is supplied to the system and no error flag remains set assuming that the watchdog timer is appropriately strobed at least every 100 milliseconds as above-described.

Braking Flow Chart

Each cycle through the main process loop visits a sub-process as defined in the braking flow chart at FIG. 8.

The initial step in the braking process is a determination as to whether or not the manual brake control has been activated. As above explained, the manual brake activation button is in the form of a potentiometer which provides a variable input to the analog to digital converter within the microprocessor. Upon confirmation that a manual brake input has been received, the processor sends a signal to activate the vehicle stoplights, and immediately thereafter updates the pulse width modulation value to a value corresponding to the proportionate amount of braking which has been selected by the manual brake potentiometer. Once the correct pulse width modulation has been established by this process, a signal is sent to the brake switching circuitry in the form of a pulse width modulated signal, which is converted to a higher power pulse with modulated output which causes the electric brakes on the vehicle to function in appropriate proportion to the amount of deflection of the manual control.

An alternative step in the braking flow process, in the event of a determination that the manual brake control has not been operated, is to determine whether or not the vehicle stop lights are on. It is the operation of the vehicle stop lights which trigger the remaining steps in the braking process. If the microprocessor determines that the stop lights are not illuminated, the braking process flow simply stores the current accelerometer non-braking values in an array within the microprocessor memory, simultaneously, the oldest stored values in the array are discarded. In this fashion, the microprocessor acceleration value array is continuously updated with vehicle acceleration data. After updating the array as described, the braking flow process is completed and the operation of the microcontroller returns to the main process loop.

If the braking process software determines, however, that the vehicle stop light is on, the braking flow process then calculates an appropriate pulse width modulation signal utilizing the data contained in the accelerometer value array.

To obtain the most precise pulse width for optimal braking, a mathematical algorithm is utilized in the software to calculate the appropriate brake output signal.

At all times while the controller is operational, accelerometer readings are taken at 1 millisecond intervals. When no braking signal is being supplied to the controller, a non-braking slow moving average is calculated, creating a non-braking slow moving average utilizing the immediate accelerometer reading and some multiple of prior accelerometer readings in a non-braking situation.

When the brakes are applied, a braking moving average is calculated utilizing the immediate raw accelerometer readings minus the non-braking moving average. This result is multiplied by a constant stored in the accelerometer value array. The value so computed replaces the oldest value in the array, so that, at any given instant during a braking event, the accelerometer array contains the most recent twenty braking moving average values. Once the value has been stored in the array, the entire array is averaged to establish a single calculated brake output value. This calculated brake output value is used to establish the precise amount of power to be applied to the brakes.

By utilizing all non-braking activity to generate a moving average acceleration value, and then using this value to calculate braking rates during the deceleration process, it is possible to remove the jerkiness or abbreviated stopping normally associated with simple inertia-based brake controllers.

The invention claimed is:

1. A brake controller for operating the brakes of a vehicle comprising:
   A microprocessor;
   An accelerometer;
   Means for generating a sequence of signals utilizing said accelerometer prior to operating said brakes;
   A storage array for storing said sequence of signals generated by said accelerometer;
   Means for averaging values stored in said array;
   Means for generating an output; and
   Means for applying braking to said vehicle based on said output.

2. A method of applying brakes to a vehicle comprising the steps of:
   providing a brake controller, said brake controller including an accelerometer;
   generating a sequence of signals utilizing said accelerometer prior to operating said brakes;
   transferring values from said accelerometer to a storage array;
   computing a moving average of the values of said storage array;

computing braking signals by a microprocessor based on said moving average; and activating the brakes of said vehicle in response to said signals provided by said microprocessor.

3. A method of automatically maintaining consistent braking utilizing measured feedback based on braking frequency, vehicle inclination and amperage measurements to correct brake fade, comprising:

provuding a brake controller, said brake controller including an accelerometer;

generating a sequence of values utilizing said accelerometer prior to operating said brakes:

transferring values from said accelerometer to a storage array;

computing a moving average of the values of said storage array;

computing braking signals utilizing a microprocessor, based on said moving average;

adjusting said braking signals based on one or more of said braking frequency, said vehicle inclination and said amperage measurements; and activating the brakes of said vehicle in response to said signals provided by said microprocessor and said amperage measurements.

* * * * *